(12) United States Patent
Fahle et al.

(10) Patent No.: US 11,629,507 B2
(45) Date of Patent: Apr. 18, 2023

(54) METHOD FOR THE PRODUCTION OF PANELS FROM A BOARD, PRESS PLATE, METHOD FOR THE PRODUCTION OF A BOARD AND BOARD

(71) Applicant: XYLO TECHNOLOGIES AG, Niederteufen (CH)

(72) Inventors: Daniel Fahle, Dresden (DE); Uwe Lippert, Dresden (DE)

(73) Assignee: XYLO TECHNOLOGIES AG, Niederteufen (CH)

( * ) Notice: Subject to any disclaimer, the term of this patent is extended or adjusted under 35 U.S.C. 154(b) by 146 days.

(21) Appl. No.: 17/264,809

(22) PCT Filed: Aug. 1, 2018

(86) PCT No.: PCT/EP2018/070874
§ 371 (c)(1),
(2) Date: Jan. 30, 2021

(87) PCT Pub. No.: WO2020/025129
PCT Pub. Date: Feb. 6, 2020

(65) Prior Publication Data
US 2021/0285232 A1 Sep. 16, 2021

(51) Int. Cl.
*E04F 15/00* (2006.01)
*E04F 15/02* (2006.01)
(Continued)

(52) U.S. Cl.
CPC ......... *E04F 15/02038* (2013.01); *B32B 3/06* (2013.01); *B32B 21/02* (2013.01);
(Continued)

(58) Field of Classification Search
CPC .......... E04F 15/02038; E04F 15/02033; E04F 15/107; E04F 2201/0138;
(Continued)

(56) References Cited

U.S. PATENT DOCUMENTS 4,142,007 A * 2/1979 Lampe ............... B32B 21/04
428/165
4,812,188 A * 3/1989 Hansen ............... B27N 3/06
156/220
(Continued)

FOREIGN PATENT DOCUMENTS

EP 1 676 720 A2 7/2006
EP 1 691 005 A1 8/2006
(Continued)

OTHER PUBLICATIONS

Eurasian Patent Office, Notification of the Necessity to Present Additional Materials in Eurasian Patent Application No. 202190254 (dated Dec. 15, 2021).
(Continued)

*Primary Examiner* — Chi Q Nguyen
(74) *Attorney, Agent, or Firm* — Leydig, Voit & Mayer, Ltd.

(57) ABSTRACT

Disclosed is a method for producing panels from a board which includes dissecting the board along predefined lines. The board includes a core material board and is laminated with a laminate material layer. The board is dissected along an impressed region running linear over the complete surface of the laminate material layer. Also disclosed are a press plate, a method for the production of a board having an impressed region, and a board for producing the panels.

30 Claims, 12 Drawing Sheets

(51) Int. Cl.
  *B32B 3/06* (2006.01)
  *B32B 21/02* (2006.01)
  *B32B 37/10* (2006.01)
  *B32B 38/00* (2006.01)
  *E04F 15/10* (2006.01)

(52) U.S. Cl.
  CPC .......... *B32B 37/10* (2013.01); *B32B 38/0004* (2013.01); *B32B 38/105* (2013.01); *E04F 15/02033* (2013.01); *E04F 15/107* (2013.01); *B32B 2307/584* (2013.01); *B32B 2451/00* (2013.01); *B32B 2471/00* (2013.01); *E04F 2201/0138* (2013.01); *E04F 2201/0153* (2013.01); *E04F 2201/042* (2013.01); *E04F 2201/043* (2013.01)

(58) Field of Classification Search
  CPC ........ E04F 2201/0153; E04F 2201/042; E04F 2201/043; B32B 3/06; B32B 21/02; B32B 37/10; B32B 38/0004; B32B 38/105; B32B 2471/00; B32B 2307/584; B32B 2451/00
  USPC .. 52/592.1, 592.3, 592.2, 578, 588.1, 309.1, 52/309.3
  See application file for complete search history.

(56) References Cited

U.S. PATENT DOCUMENTS

| | | | | |
|---|---|---|---|---|
| 5,417,024 A * | 5/1995 | San Paolo | ................. | E06B 5/16 52/456 |
| 5,573,829 A * | 11/1996 | Decker | .................. | B28B 11/04 156/39 |
| 6,364,982 B1 * | 4/2002 | Lynch | ................ | B65D 19/0095 156/196 |
| 8,176,698 B2 * | 5/2012 | Lewark | ................... | E04F 15/02 52/592.1 |
| 8,881,494 B2 * | 11/2014 | Daniels | ..................... | E04B 1/80 52/784.14 |
| 9,610,738 B2 | 4/2017 | Gallant et al. | | |
| 10,493,653 B2 | 12/2019 | Hermann et al. | | |
| 11,274,489 B2 * | 3/2022 | Moore, Jr. | ............ | E06B 3/7015 |
| 2006/0178773 A1 * | 8/2006 | Mogadam | ............... | G01F 9/008 700/213 |
| 2008/0041014 A1 * | 2/2008 | Lynch | ................... | E06B 3/7003 52/745.19 |
| 2010/0186337 A1 * | 7/2010 | Barretto | .................. | B32B 9/042 428/332 |
| 2010/0242391 A1 * | 9/2010 | Meersseman | ........... | E04F 15/02 52/311.1 |
| 2012/0066907 A1 | 3/2012 | Gallant et al. | | |
| 2016/0177577 A1 * | 6/2016 | Cappelle | ................ | B65D 85/62 52/582.2 |
| 2018/0133922 A1 | 5/2018 | Hermann et al. | | |

FOREIGN PATENT DOCUMENTS

| | | |
|---|---|---|
| EP | 2 905 135 A2 | 8/2015 |
| WO | WO 2010/136717 A2 | 12/2010 |
| WO | WO 2016/180643 A1 | 11/2016 |
| WO | WO 2017/001976 A1 | 1/2017 |
| WO | WO 2017/072657 A1 | 5/2017 |

OTHER PUBLICATIONS

European Patent Office, International Search Report in International Application No. PCT/EP2018/070874 (dated Apr. 9, 2019).

European Patent Office, Written Opinion in International Application No. PCT/EP2018/070874 (dated Apr. 9, 2019).

European Patent Office, International Preliminary Report on Patentability in International Application No. PCT/EP2018/070874 (dated Feb. 2, 2021).

* cited by examiner

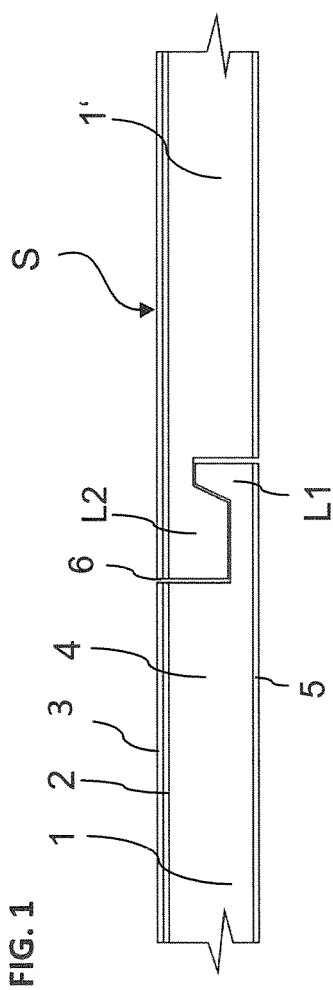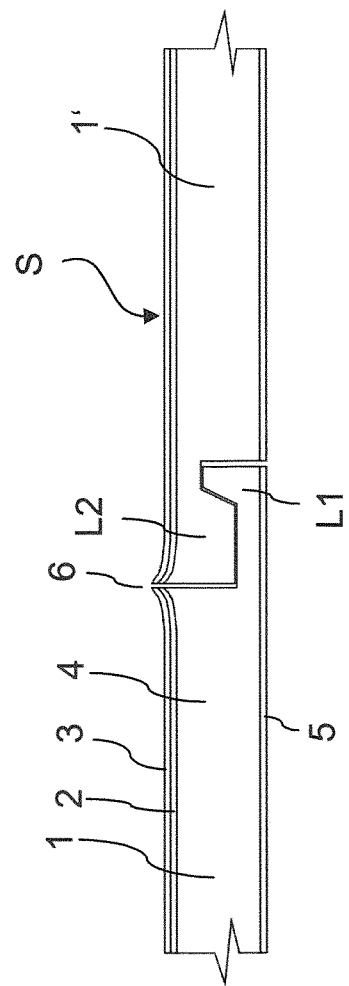

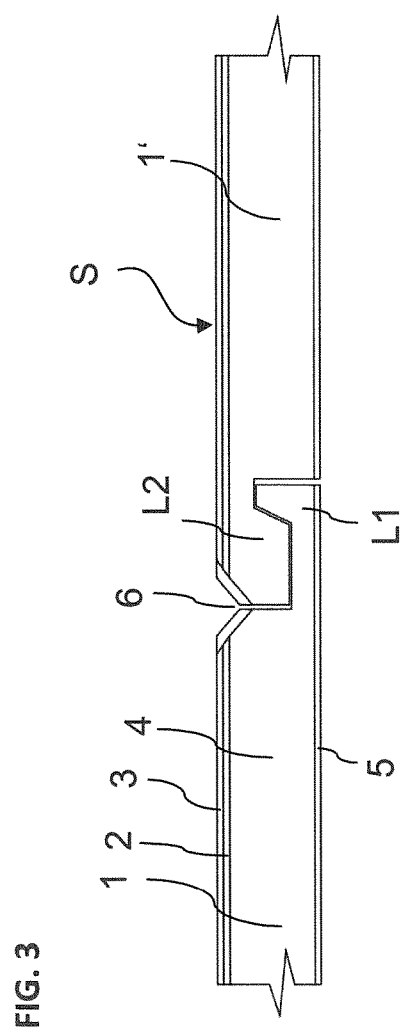

METHOD FOR THE PRODUCTION OF PANELS FROM A BOARD, PRESS PLATE, METHOD FOR THE PRODUCTION OF A BOARD AND BOARD

CROSS-REFERENCE TO A RELATED APPLICATION

This patent application is the U.S. national phase of International Application No. PCT/EP2018/070874, filed on Aug. 1, 2018.

TECHNICAL FIELD

The present invention is directed to a method for the production of panels from a board. Said panels are produced from the board by dissecting the board along predefined lines. The board comprises a core material board and is laminated with a laminate material layer. At least one impressed region running linear over the complete surface is present in the surface where the laminate material layer is present. The dissecting of the board is accomplished along these impressed regions. After dissecting pairing mechanical locking means at opposite edges of the raw boards are milled out. According to the present invention, the impressed region has a well defined width in order to allow deviations from an ideal dissecting plane, when dissecting the board in order to produce panels. The present invention furthermore relates to a press plate, allowing for the production of boards having well defined impressed regions. Furthermore, the present invention discloses a method for the production of a board, having a specific defined impressed region. In addition, also a board for the production of panels is described.

PRIOR ART

The classical manufacturing process for laminate panels involves providing a large board of a core material, a décor (either in the form of an impregnated paper or printed onto the core) and a wear resistant layer (typically an overlay and a layer containing e.g corundum particles) on the top side as well as a backing layer on the bottom side. All these layers are then laminated together in a press at elevated temperatures and at elevated pressures thereby producing a large laminate board. The press commonly employs a press plate, which commonly also serves to press a three dimensional structure onto the top surface of the laminate board. Such a structure might imitate e.g a wood structure with growth rings or a tile pattern or the like.

The large laminated board is then subsequently cut longitudinally and transversally into separate panels, which again are subsequently milled at their edges in order to obtain locking profiles thereon. Bevel surfaces are conveniently milled together with the surfaces of the locking profiles.

Milling however is a time-, material-, tool- and thereby cost consuming process which is to be avoided as far as possible.

Therefore it is desirable to use the press plate to press the bevels into the laminate board so that the bevels do not have to be milled away later in the manufacturing process.

For example, WO 2017/072657 A1 describes a floor panel with a substrate and a top layer of laminate, which floor panel, at one or more edges, is provided with a lower edge region, characterized in that the laminate extends in one piece from the actual upper surface of the substrate over the lower edge region at least up to a point, wherein the laminate surface is situated at a level in a horizontal plane which intersects the aforementioned substrate, and that a substrate material, at a location of the lower edge region, has the same or lower density than at the actual upper surface of the substrate material. Said patent application also relates to a method for realizing such floor panels.

EP 1 691 005 A1 describes floor boards consisting of a core and a surface layer with curved edge positions, which are formed by a compression of the core.

WO 2017/001976 A1 describes a floor panel with a substrate and a provided thereon decorative layer of wood veneer having a thickness of 1 mm or less, characterized in that said substrate as an average density of more than 750 kg per cubic meter and that said decorative layer is provided on a substrate by means of a layer on the basis of thermosetting resin situated between the substrate and a decorative layer. The invention also relates to a method for manufacturing such a floor panel, wherein a structured veneer surface can be obtained.

Furthermore, EP 1 676 720 A2 describes floor coverings consisting of rectangular laminate panels comprising a core and a decorative imprinted layer at the upper side of the panels, said core being made of wood which has been ground into particles or fibers mixed with a binding agent, such as MDF or HDF, wherein these panels are provided, at least in two opposite edges with coupling means made in one piece with the panels so that several of such panels can be mutually coupled without any play or practically without any play, whereby these coupling means provide for an interlocking in a direction perpendicular to the plane of the floor covering, as well in a direction perpendicular to the edges concerned and parallel to the plane of the floor covering, characterized in that the panels are provided, at least on the above-mentioned edges, near the topside, with a bevel extending through the decorative imprinted layer and the core, said bevel being provided of a decorative layer, which layer is provided as separate.

WO 2010/0136717 A2 relates to panels, wherein the first panel has a first profile and a second panel as a second profile. These panels can be joined horizontally and vertically by said profiles.

TECHNICAL OBJECTIVE

All of the afore panels normally are produced in that a large board, having a core and a decorative layer thereon, is dissected into a plurality of panels. The dissection e.g. can be accomplished by linear sawing of the board along predefined dissecting lines. The obtained raw panels are processed further, e.g. the coupling means are mitted out in subsequent production steps.

Especially for the case, that—for aesthetic regions—the board has impressions or bevels, which appear in the dissected panels as sloped edge, an ideal dissecting of the board is essential in order to avoid that these bevels in the produced panels mismatch each other. For example, if a board is dissected along a dissecting line which is running not exactly at the ideal theoretical dissecting line (but e.g. slightly angled and/or thereto) the dissection line will run through the levels, making the panels unsuitable in order to produce a optical perfect flooring. Furthermore, the topping layers (such as e.g. the decorative layer, which also can have technical functions such as a protection against the intrusion of water) can be destroyed, so that an accordingly mismatched dissected board loses its protection and/or functionality.

However, in the above-mentioned dissection errors sometimes cannot be fully avoided, especially in the case that the means for dissecting, such as e.g. the saw, has a systematic error, or when an occasional error occurs when dissecting a board (such as e.g. when the board is slightly moved during the dissection action).

Accordingly, it is the objective of the present invention, to provide panels which e.g. allow for the production of perfect panels, even when systematic or arbitrary errors occur when dissecting a board, from which said panels are produced.

DETAILED DESCRIPTION OF THE INVENTION

This objective is solved by the method described herein, and the press plate, method for the production of a board, a board for the production of panels and panels, all described herein. Preferred embodiments according to the invention are also described.

In a first aspect the present invention relates to a method for the production of panels from a board, the method comprising providing a board, comprising a core material board laminated with a laminate material layer onto a surface of the core material board forming a laminated surface of the board said board having at least one impressed region comprising at least one impression of the laminated surface, said at least one impression has linear progression and extends over the complete surface of the board, wherein in cross-section perpendicular to the extension direction of each of the at least one impression said impressed region having transitions at each outermost region of the impressed region where a transition of the surface to a bottom of the impressed region occurs, said transitions having a width and being adjoined by a part of the impressed region where the bottom of the impressed region is parallel to the surface of the board.
linearly dissecting the board along a dissection line running in each of the at least one impressed regions in one or more dissection steps to produce raw boards with a dissection means having a dissection width,
milling out pairing mechanical locking means at opposite edges of the raw boards, comprising a first mechanical locking means having a first width and a pairing second mechanical locking means having a second width (12), wherein
the at least one impressed region having an overall width which is the sum of the dissection width, the first width of the first mechanical locking means, the second width of the second mechanical locking means, the width of the transitions, a sacrificial machining width, as well as a manufacturing tolerance said manufacturing tolerance being calculated as 0.10 to 3.0-fold of the dissection width.

According to the method of the present invention, the impressed region has a selected width which is the sum of selected partial widths. The dissection width corresponds to the breadth of the means used for dissection, e.g. that breadth of a saw blade, when dissecting of the board is accomplished by sawing.

According to the invention the at least one impression has linear progression and extends over the complete surface of the board. A linear progression of the impression means that said impression has a straight course over the entire surface of the board from one end to the other. If e.g. the board has a rectangular shape, the impression—or in the case that there are more than one impressions the impressions—run from e.g. the short side of the board to the opposite short side and parallel to the long sides of the board.

The impressed region is produced by a compression step of the core material board and the laminate material layer before dissecting the board as demanded by the present invention. The compression step—as part of the production method for producing the panel—is described in greater detail below. Accordingly, due to the compression at least the core material board or both the core material board and the laminate material layer exhibit a greater density in the at least one compressed region, compared to the remaining regions. Due to the higher density, these regions have an enhanced mechanical stability. These compressed regions with higher stability form the later edges of the panels with the locking means once milled out of the boards. Accordingly the present invention allows in one step to form impressions in a board at a location where later e.g. a bevelled edge in a panel will be present. Due to the compression (and the resulting higher density of the compressed regions of the board/the panel) not only the mechanical stability of both the edge of the to be formed panel and the mechanical locking means is enhanced, the present invention at the same time makes an additional working step (in which the "impression" or the bevel needs to be milled out separately) superfluous.

The width of the transitions is the width of a region where the upper surface of the board is transferred to a lower surface, i.e. the surface of the impression.

The width of the mechanical locking means is a width of said locking means, measured from an upper edge of the panel towards the outer edge of the respective locking means. Optionally, also an additional sacrificial machining width is added to the width of the impressed region.

According to the invention, a manufacturing tolerance is added to the overall width of the impression, which is dependent on the dissection width. Said manufacturing tolerance is calculated to be the 0.10 to 3.0-fold of the dissection width.

The present invention therefore specifically defines the overall width of the impression, allowing that even when systematic or occasional errors occur during the dissection of the board, which e.g. could lead to a parallel shift of the board when dissecting or a slightly diagonal dissecting of the board, optimal results can be achieved when the board is dissected. Even if these dissecting errors occur during dissecting, still the edge of the obtained panels perfectly match to each other, so that when said panels are aligned to e.g. floor covering, no errors at the abutting edges are obtained. The present invention guarantees, that the edges of the produced panels always have the same height and no mismatch between the panels occurs.

According to a preferred embodiment the manufacturing tolerance is calculated as 0.25 to 2.5-fold of the dissection width, preferably as 0.40 to 2.0-fold of the dissection width, further preferred as 0.50 to 1.75-fold of the dissection width, especially preferred as 0.60 to 1.60-fold of the dissection width.

Preferably, the linear dissection of the board is accomplished by sawing, in particular with a buzz saw.

The impressed region can be completely impressed, i.e. wherever the impressed region is present on the board, in cross section only one impression occurs.

According to a specific embodiment, however, the at least one impressed region comprises two pairwise and parallel aligned impressions, said impressions are have a linear progression (i.e. they have a linear course) and extend over the complete surface of the board.

If e.g. two impressions are present to form a impressed region, it is preferred that the impressions have a width with a distance between the both impressions fulfilling the following criteria: 0.5 y≤z≤10.0 y, preferably 1.0 y≤z≤5.0 y, especially preferred 1.5 y≤z≤3.2 y, wherein y is the width of the impressions and z is the distance between the two impressions. The width of the impressions is the distance over which said impression is impressed in the surface of the board. The width is measured in cross-section to the progress of the impressions.

It is possible that the impressions have a width in between 1.0 and 20 mm, preferably in between 3.0 and 5.0 mm.

Furthermore, a distance between the both impressions forming each pair of impressions can be in between 1.5 and 50 mm, preferably 5.0 and 25 mm, especially preferred 7.5 and 15 mm.

In any of the above-mentioned cases it is preferred that the board has rectangular shape with at least one impressed region, e.g. the impressions extending parallel to the edges of the board.

Furthermore, the board preferably comprises more than one impressed regions, such as e.g. at least two impressed regions. Said plurality of impressed regions can e.g. run parallel to each other; alternatively or additionally it is also possible that the impressed regions intersect at a right angle. If the board is rectangular, said impressed regions e.g. are aligned parallel to each of the edges of the board. That is preferably the board has a rectangular shape with long sides and short sides, comprising at least one impressed region parallel to the long sides and least one impressed region parallel to the short sides, intersecting each other.

Even more preferred, the number of impressed regions parallel to the long sides is larger than the number of impressed regions parallel to the short sides.

For example, the board can comprise 2 to 15, preferably 5 to 12, especially preferred 8 to 11, e.g. 9 impressed regions parallel to the to the long sides and/or 1 to 6, preferably 1 to 5, especially preferred 2 to 4, e.g. 3 impressed regions parallel to the to the short sides.

In an exemplary case, the board is rectangular and comprises 9 impressed regions running equidistant parallel to the long edges of the board as well as 3 impressed regions running equidistant parallel to the short edges of the board.

The impressed depth of the at least one impressed regions, e.g. of the at least one impressed region, e.g. of the impressions measured from a surface of the board is preferably in between 0.1 and 2.0 mm, preferably 0.3 to 1.0 mm, especially preferred 0.5 to 0.7 mm.

The geometry of the transitions preferably have linear or curved progression, when seen in a cross sectional view of the board in direction of process of the at least one impression.

In case that the transitions are curved, a concave geometry or a geometry transiting from the surface of the board to the bottom of the impression in a convex/concave manner is especially preferred.

Especially preferred the width of each of the transitions, in relation to a overall width of the impressed region can be in between 0.1% to 20%, preferably in between 1% and 10%, especially preferred in between 2.5 and 5%.

As far as the width of the transitions are concerned, it is preferred that the width of each of the transitions is in between 0.2 and 10.0 mm, preferably in between 0.5 and 5.0 mm, especially preferred in between 0.7 and 1.5 mm.

The pairing mechanical locking means, which are provided on both edges of the resulting panels normally have different widths.

For example, the first width of the first mechanical locking means is in between 2.0 and 20 mm, preferably in between 5.0 and 15 mm, especially preferred in between 7.0 and 9.0 mm.

In addition or in alternative thereto, the second width of the second mechanical locking means is in between 0 and 10 mm, preferably in between 0.5 and 5 mm, especially preferred in between 1.0 and 2.0 mm.

The optional sacrificial machining width can be in between 0 and 10 mm, preferably in between 1.0 and 8.0 mm, especially preferred in between 2.0 and 6.0 mm.

In cross section the at least one impressed region, or, when a impressed region is formed by more than one impressions, said at least one impressed regions, or said impressions are U-shaped, semicircular, trapezoidal, rectangular, trough-shaped and combinations thereof.

Especially, if an impressed region is formed by only one impression, a U-shaped cross section is preferred. In this context, it is furthermore preferred, if the lower surface of the U-shaped impression has a part that runs parallel to the upper surface of the boards. If more than one impression form the impressed region, it is preferred, that each impression has a part, which runs parallel to the upper surface of the board. In case that e.g. two impressions for an impressed region, it is also possible, that e.g. the outer transitions of the impressions have e.g. a concave cross section, whereas the inner transitions of the impressions have a different shape. The aforementioned embodiment is an example for a combination of different geometries of the cross sections, which especially are possible when more than one impression forms a impressed region.

The surface of the board, which is the region where the board is not impressed, preferably is smooth or comprises impressions, such as e.g. wood grain, tile or stone imitations. The impressions can contribute to a imitation and surface feeling of natural wood, grain or stone, respectively.

According to a preferred embodiment, in the impressed region, such as e.g. in the regions of the impressions a surface of the transitions and/or the bottom is smooth and/or the laminate material layer in the region of the transitions and/or the bottom is unicolor.

For example, the core material of the core material board can be selected from the group consisting of MDF, HDF, Direct Pressure Laminate (DPL), Continuous Pressure Laminate (CPL) chip boards, oriented strand boards, boards composed of rock wool, cement fibers, PVC Thermoplastics, foams and combinations thereof.

The laminate material layer, forming the surface of the board preferably comprises at least one decorative layer and at least one wear resistant layer. The wear resistant layer also can be an overlay layer. However, it is also possible that more than the aforementioned specific layers are present.

Especially, the decorative layer comprises a wood like decor, which is identical to the wood grain like impressions of the surface of the board, wherein said decorative layer is aligned in that the wood like decor is in accordance with the wood grain like impressions of the surface of the board.

For example, the laminate material layer is laminated to the core material board by means of a thermo-setting resin.

In the method according to the present invention it is especially preferred if the board comprises two pairwise and parallel aligned impressions in the at least one impressed region. In this case it is possible that the pairwise and parallel aligned impressions are separated by a protrusion where the impressions have inner flanks at said protrusion. This allows for the monitoring of the at least one of the inner flanks by means of a detection means, such as an optical detection means (e.g. a camera), resulting in a monitoring signal which is used to control a position of the dissection means during dissecting.

In this case, the inner flanks specifically are unicolor, especially in a light color such as e.g. white or off-white allowing an easier and more precise monitoring.

According to a second embodiment, the present invention relates to a press plate which can be used in the production of boards described in the foregoing. According to the invention, the press plate comprises a main body comprising a pressing surface for pressing a board, said main body comprising
at least one pressing region, having at least one impression means which projects beyond the pressing surface, said at least one impression means has linear progression and extends over the complete pressing surface,
wherein in cross-section perpendicular to the extension direction of each of the at least one impression means said pressing region having transitions at each outermost region of the pressing region where a transition of the
pressing surface to a upper surface of the pressing region occurs, said transitions having a width and being adjoined by a part of the pressing region where the upper surface of the pressing region is parallel to the pressing surface.

The at least one pressing region is adapted to perform a method described in the foregoing, i.e. preferably has an overall width which is the sum of the width of the transitions, a dissection width when the board is dissected with a dissection means having said dissection width, a first width and a second width of pairing mechanical locking means to be milled out at opposite edges of the raw boards, an sacrificial machining width, as well as a manufacturing tolerance said manufacturing tolerance being calculated as 0.10 to 3.0-fold of the dissection width.

The dimensions of the pressing regions of the press plate correspond to the dimensions of the impressed regions of the boards, produced with a press plate according to the present invention.

In a preferred embodiment, the manufacturing tolerance is calculated as 0.25 to 2.5-fold of the dissection width, preferably as 0.40 to 2.0-fold of the dissection width, further preferred as 0.50 to 1.5-fold of the dissection width, especially preferred as 0.60 to 1.60-fold of the dissection width.

Furthermore, it is preferred that the at least one pressing region comprises two pairwise and parallel aligned impressions means, said impressions means have linear progression and extend over the complete pressing surface of the press plate.

Especially, the impression means have a width with a distance between the both impression means fulfilling the following criteria: $0.5\ y' \le z' \le 10.0\ y'$, preferably $1.0\ y' \le z' \le 5.0\ y'$, especially preferred $1.5\ y' \le z \le 3.2\ y'$:

For example, the impressions means have a width in between 1.0 and 20 mm, preferably in between 3.0 and 5.0 mm.

Preferably, a distance between the both impression means forming each pair of impressions is in between 1.5 and 50 mm, preferably 5.0 and 25 mm, especially preferred 7.5 and 15 mm.

Especially, the press plate has rectangular shape with the at least one pressing region, e.g. the impression means extending parallel to the edges of the press plate.

Furthermore, it is preferred that the press plate comprises at least two pressing regions which are aligned parallel to each other or intersect at a right angle.

In a special embodiment thereof, the press plate has rectangular shape with long sides and short sides, comprising at least one pressing region parallel to the long sides and least one pressing region parallel to the short sides, intersecting each other.

Preferably, the number of pressing regions parallel to the long sides is larger than the number of pressing regions parallel to the short sides.

For example, the press plate can comprise 2 to 15, preferably 5 to 12, especially preferred 8 to 11, e.g. 9 pressing regions parallel to the to the long sides and/or 1 to 6, preferably 1 to 5, especially preferred 2 to 4, e.g. 3 pressing regions parallel to the to the short sides.

The height of the at least one pressing region, e.g. the impression means preferably is in between 0.1 and 2.0 mm, preferably 0.3 to 1.0 mm, especially preferred 0.5 to 0.7 mm.

The transitions of the press plate can have linear or curved progression. As far as the linearity or curvedness of the transition is concerned, reference is made to the corresponding transition regions of the board above, having the corresponding geometry. Especially, if the transitions of the press plate are curved, said curved transitions are convex, corresponding to the concave transitions of the board. In accordance also a concave/convex geometry is possible, allowing the production of a corresponding convex/concave transition in the board.

According to a specific embodiment the width of each of the transitions, in relation to a overall width of the pressing region is in between 0.1% to 20%, preferably in between 1% and 10%, especially preferred in between 2.5 and 5%.

Preferably, the width of each of the transitions is in between 0.2 and 10.0 mm, preferably in between 0.5 and 5.0 mm, especially preferred in between 0.7 and 1.5 mm.

In another embodiment, the cross section of the at least one pressing region, e.g. the impression means can be U-shaped, semicircular, trapezoidal, rectangular, through-shaped and combinations thereof.

The pressing surface of the pressing plate, i.e. the surface of the press plate except the pressing regions preferably is smooth or comprises impressions, such as wood grain, tile or stone imitations. The pressing surface of the press plate accordingly can impress e.g. a wooden like structure and to the board while pressing.

Furthermore is preferred, that the surface of the press plate in the region of the transitions and/or a upper surface is smooth.

According to a third aspect of the present invention, a method for the production of a board, suitable for the production of panels is described, said method comprising providing a core material board,
providing a laminate material layer onto a surface of the core material board,
joining the laminate material layer and the core material board by pressing with a press plate according to the present invention as described in the foregoing, wherein the pressing surface of the press plate is pressed onto the laminate material layer,
or pressing a core material board laminated with a laminate material layer with a press plate according to the present invention as described in the foregoing, wherein the pressing surface of the press plate is pressed onto the laminate material layer,
wherein the at least one pressing region of the press plate compact the laminate material layer and/or the core material board, to form at least one impressed region in the laminate material layer and/or the core material board,
said at least one impressed region preferably having an overall width which is the sum of the dissection width, the width of the first profile, the width of the second profile, the width of the transitions, an sacrificial machining width, as well as a manufacturing tolerance said manufacturing tolerance being calculated as 0.10 to 3.0-fold of the dissection width.

As far as the press plate is concerned, all details associated with the second aspect of the present invention are incorporated for the purpose of the method for the production of a board an equal manner.

According to a preferred embodiment, the core material of the core material board is selected from the group consisting of MDF, HDF Direct Pressure Laminate (DPL), Continuous Pressure Laminate (CPL) chip boards, oriented strand boards, boards composed of rock wool, cement fibers, PVC Thermoplastics, foams and combinations thereof.

In another aspect of the present invention, the laminate material layer comprises at least one decorative layer, at least one wear resistant layer and at least one overlay layer.

Furthermore it is preferred, that the decorative layer comprises a wood like decor, which is identical to the impressions of the pressing surface of the press plate, wherein said decorative layer is aligned in that the decor is in accordance with the impressions of the pressing surface.

According to an aspect of the present invention, the laminate material layer is soaked in a thermosetting resin before, during and/or after being provided onto a surface of the core material board.

According to another preferred embodiment of the present invention, a backing layer is applied onto an opposite surface core material board of the surface onto which the laminate material layer is provided.

The surface of the core material board onto which the laminate material layer is provided can be smooth or can have impressions which correspond to the impression means of the press plate.

Furthermore, the present invention relates to a board for the production of panels, comprising a core material board laminated with a laminate material layer onto a surface of the core material board forming a laminated surface of the board, said board having at least one impressed region, comprising at least one impression of the laminated surface, said at least one impression has linear progression and extends over the complete surface of the board, wherein in cross-section perpendicular to the extension direction of each of the at least one impression said impressed region having transitions at each outermost region of the impressed region where a transition of the surface to a bottom of the impressed region occurs, said transitions having a width and being adjoined by a part of the impressed region where the bottom of the impressed region is parallel to the surface of the board,
wherein preferably
the at least one impressed region having an overall width which preferably is the sum of the dissection width when the board is dissected with a dissection means having said dissection width, a first width and a second width of pairing mechanical locking means to be milled out at opposite edges of the raw boards, an sacrificial machining width, as well as a manufacturing tolerance said manufacturing tolerance being calculated as 0.10 to 3.0-fold of the dissection width.

All aspects associated with the aforementioned board described with previous aspects of the present invention are valid for the board according to the present invention as well. E.g. the board can be prepared according to the aforementioned method for the production of a board according to the present invention.

Furthermore, the present invention relates to a panel comprising
a core material board laminated with a laminate material layer onto a surface of the core material board forming a laminated surface of the panel,
pairing mechanical locking means at opposite edges of the panels, comprising a first mechanical locking means having a first width at a first edge and a pairing second mechanical locking means having a second width at an opposite edge, wherein along each of the opposite edges an impression of the laminated surface is present, each of the impressions is part of the respective edge, has linear progression and extends over the complete surface of the board, wherein in cross-section perpendicular to the extension direction each impression has a transition at the region farthest from the respective edge where the respective impression is present where a transition of the surface to a bottom of the impression occurs, said transitions having a width and being adjoined by a part of the impressed region where the bottom of the impressed region is parallel to the surface of the board.

The pairing locking means allow an pairwise joining of two identical panels along the opposite edges where the pairing locking means are present. This joining mechanism is otherwise well known in the art.

All aspects associated with the aforementioned panel described with previous aspects of the present invention are valid for the panel according to the present invention as well. E.g. the panel can be prepared according to the first aspect of the present invention.

Preferred embodiments of the invention are described in the following with reference to the drawings, which are for the purpose of illustrating the present preferred embodiments of the invention and not for the purpose of limiting the same.

BRIEF DESCRIPTION OF THE DRAWINGS

FIG. 1 shows a schematic side view of two connected prior art panels and their buildup FIG. 2 shows a schematic side view of two connected prior art panels with swelling FIG. 3 shows a schematic side view of a V-shaped bevel as known in the art

DESCRIPTION OF PREFERRED EMBODIMENTS

Figure 4:
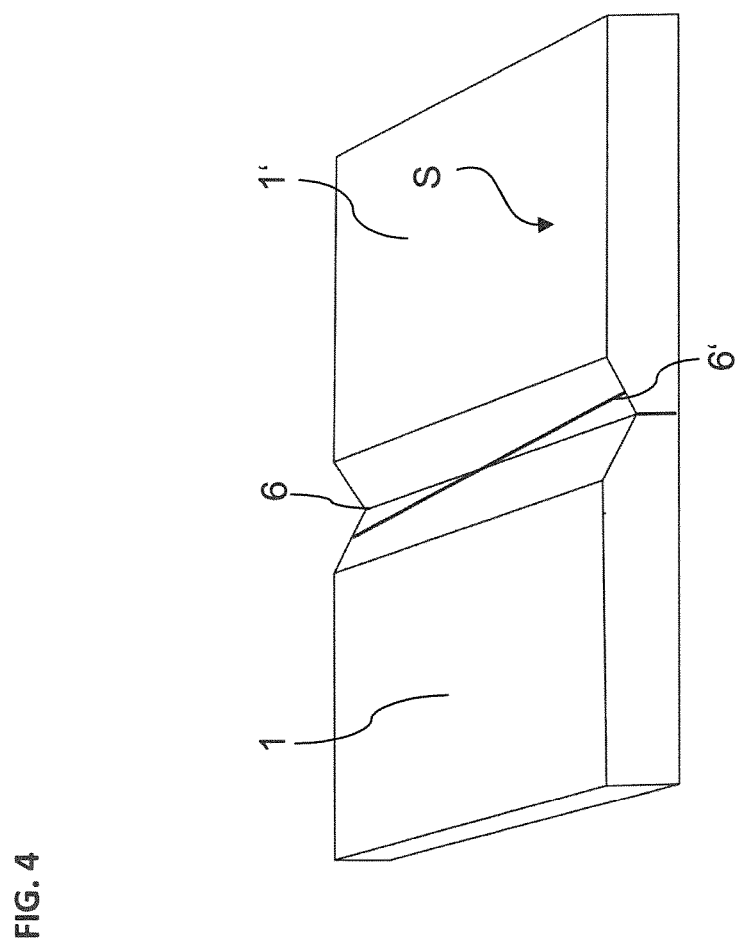
FIG. 4 shows a schematic side view of the abutment region of two panels with a V-shaped bevel together with an optimum- and a misaligned abutment line

In the figures the same reference numerals have the same meaning, even if not explicitly mentioned in the description of the respective drawing.

FIG. 1 shows a schematic side view of two connected prior art panels 1, 1' and their buildup, connected along an abutment line 6. Classical medium density or high density (MDF/HDF) laminate flooring panels are known in the art and are commonly made of an (MDF/HDF) core 4, a décor layer 2 commonly consisting of impregnated paper and a (mainly transparent) wear- and abrasion or wear resistant layer 3 plus a backing layer 5 which can be built of a counter draw paper or sound insulation or the like, having a front or visible surface S. They also mostly comprise some variant of locking means L1, L2 such as locking profiles usually on all four long- and short sides of the laminate panels.

FIG. 2 shows a schematic side view of two connected prior art panels 1, 1' as described in FIG. 1 with some degree of swelling around a simple butt joint 6. Such swelling at the abutment surfaces of panels may occur if moisture or cleaning fluids enter into an MDF/HDF core 4 or by simple thermal expansion of any material such as MDF or PVC. A similar situation is generated also when two adjacent panels 1, 1' are not exactly in the same horizontal plane and one adjacent edge is slightly higher than the other, which can be caused e.g. by an uneven underground. A further cause of a similar problem might be slight variations in the panel thickness, caused by incontrollable production parameters. Once such swelling or horizontal misalignment occurs at panel edges, the protective layer 3 can easily be attacked by everyday wear and it can happen that the decorative layer is abraded away, which would result in unaesthetic floor coverings.

FIG. 3 shows a schematic side view of two connected prior art panels with a V-shaped bevel. Such bevels between adjacent panels are employed both for technical reasons as mentioned above, but also because bevels provide an esthetical overall appearance of the laid flooring panels by contrasting the bevel appearance or color to the décor and because slight unevenness in the underground is less visible and thereby less disturbing. Such V-shaped and decorated bevels are known in the art.

FIG. 4 shows a schematic side view of the abutment region of two panels 1, 1' as previously described in FIG. 3 with a V-shaped bevel together with an optimum-aligned abutment line 6 and a misaligned abutment line 6'. It is obvious that even a small misalignment of the saw cut (and thereby also of the subsequently milled profiles)—when producing the panels from sawing them from a (not shown) board—against the pressed bevels (i.e. the V-shaped bevel) is very visible on a V-shaped bevel profile, as any misalignment of the cut would also result in a misalignment of the height of the abutment surface. Such a misalignment of the height of the abutment surface would also result in crevasses or cut-offs which could accumulate liquids and promote swelling.

Figure 5:
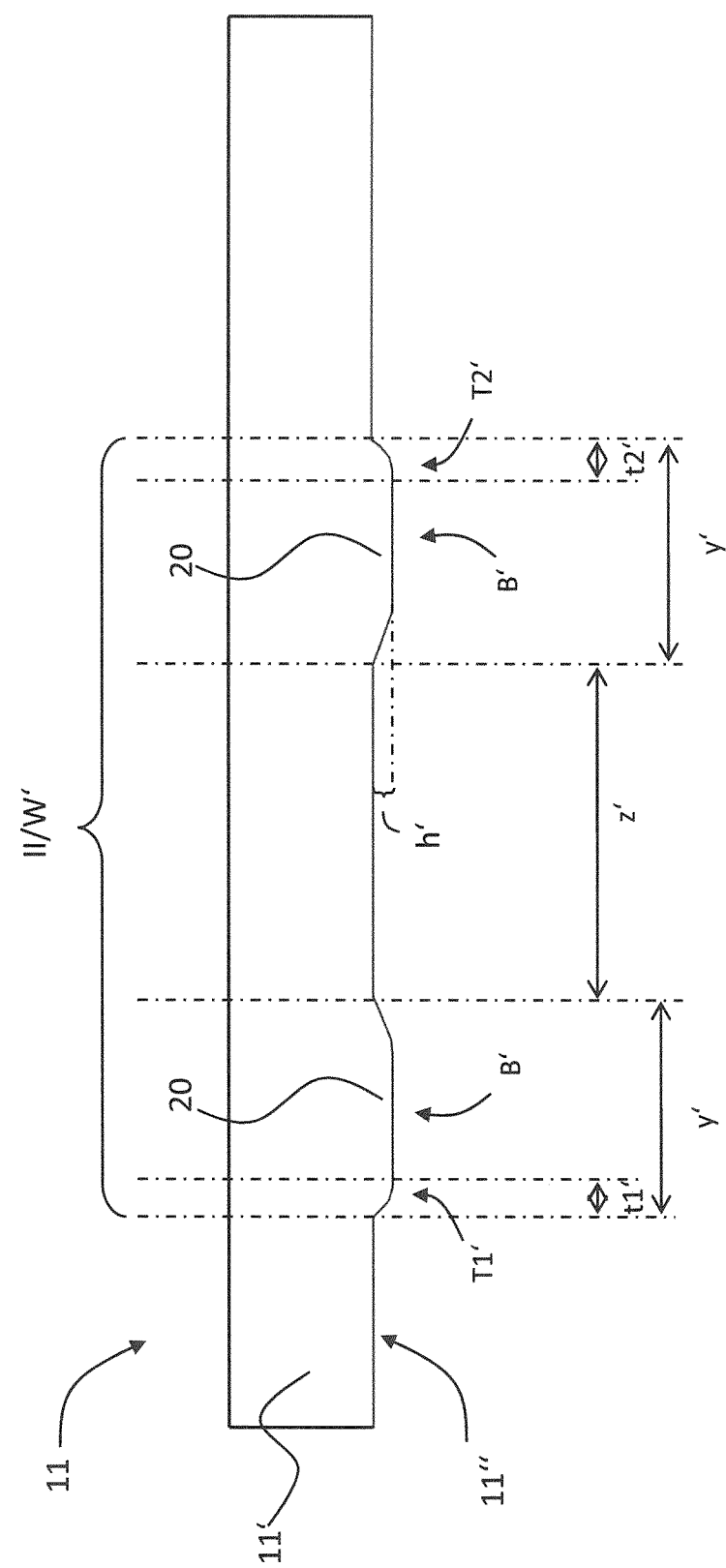
FIG. 5 shows a cross-sectional view of a press plate according to the invention as used in the production of a board

FIG. 5 shows a press plate 11 according to the present invention. The press plate comprises a main body 11' as well as a pressing surface 11'' on which in case of the press plate 11 shown in FIG. 5 a pressing region II is aligned. The pressing region II comprises a pair of impression means 20 which protrude beyond the otherwise smooth pressing surface 11'' of the press plate 11. The impression means 20 run in linear manner over the complete surface of the press plate 11, i.e. in case of FIG. 5 run into the drawing plane. In alternative embodiments the press plate 11 also could comprise more than one pressing regions II running parallel to each other or intersecting each other e.g. at a right angle (see e.g. FIG. 6). It is also possible that the pressing region II comprises only one impression means. The impression means 20 protrude with a height h' beyond the pressing surface 11''. In the shown cross section the pressing region II has a total width W'. The pressing surface 11'' accordingly exhibits two transitions T1', T2' where the pressing surface 11'' is transferred from to the protruding impression means 20, in detail to the upper surface B' of the impression means 20. Said transitions T1', T2' are located at the outermost region of the pressing region (II). As can be seen in FIG. 5 in cross section the transitions T1', T2' are convex and have equal widths t1', t2'. The transitions, however, also could be linear. The upper surface B' of the pressing region II or the impressing means 20, respectively, runs parallel to the pressing surface 11'. Since the press plate 11 has two distinct impression means 20, these impression means are separated from each other by a gap, in which the upper surface is setback with respect to the upper surface B'. Said gap has a width z, whereas the impression means 20 themselves have a width y'. The total impression width W' of the impression region accordingly is the sum of the widths y' of the impression means 20 and the width z of the gap separating the impression means 20. This width W' on the other hand side is calculated in order to allow the production of boards from which panels can be sawn. Said width W' is well adjusted in order to avoid that during the sawing of the boards panels are obtained which have mismatched edges.

Figure 6:
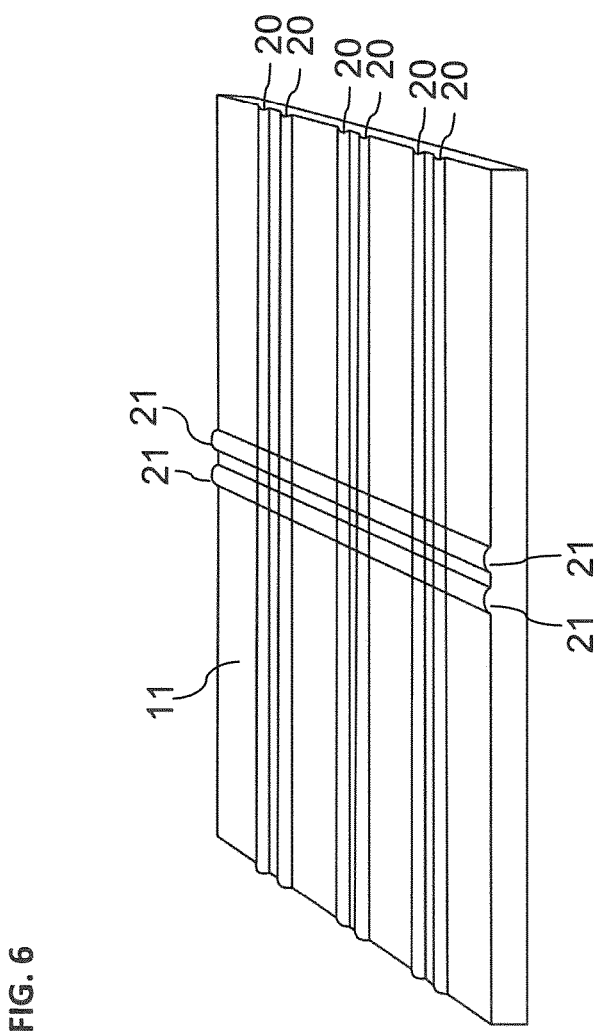
FIG. 6 shows a schematic view of an upturned press plate with pairs of longitudinal- and transversal groove impression means

FIG. 6 shows a schematic example view of an upturned press plate according to the invention with pairs of longitudinal- and transversal impression means as described in detail in FIG. 5. Both impression means 20 and 21 can be identical as far as their dimensions are concerned, with the exception of their direction.

Figure 7:
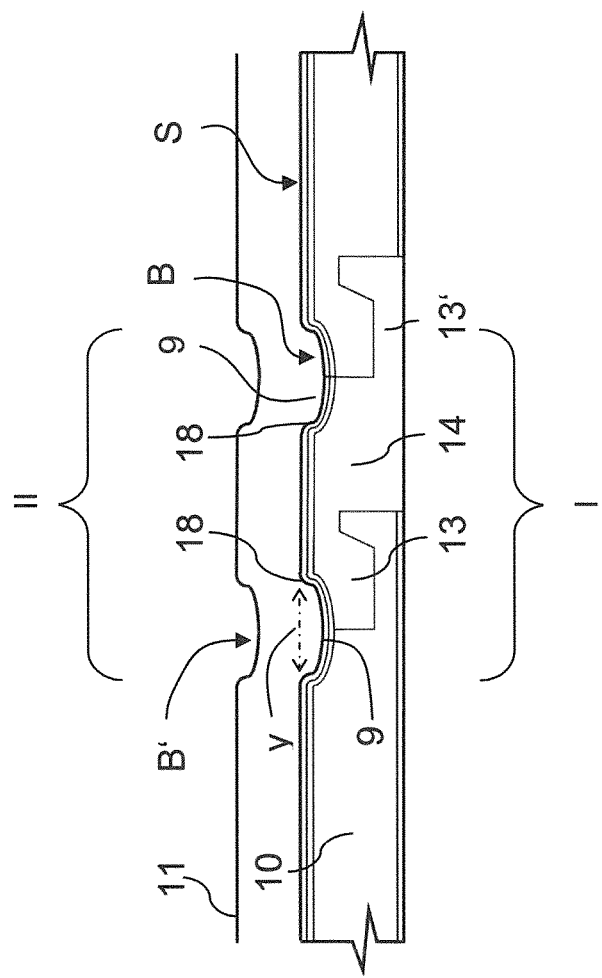
FIG. 7 shows a board before being sawed and milled to panels, together with the surface of press plate according to the invention

FIG. 7 shows a board 10 produced with a press plate 11 as shown in detail in FIGS. 5 and 6 before being sawed into raw panels and being milled to form the final panels. Also shown is the press plate 11 according to the invention. The board principally has the same layered construction as the panels shown in FIG. 1, i.e. has a core 4, laminated with e.g. a decorative layer 2 and a wear layer 3 (the reference numerals of the core, the decorative layer and the wear layer are not shown for reasons of clarity). The core can be laminated with the decorative layer and the wear layer during pressing of the board 10 with the press plate 11. As shown in FIG. 7 an impressed region I comprising two impressions 9 having a width y is formed when pressing the board with the press plate 11. Said impressed region I corresponds to the pressing region II of the press plate 11. The two impressions 9 are separated by a protrusion, corresponding to the gap of the corresponding press plate 11. Said protrusion comprises inner flanks 18. In FIG. 7 also a sawing region 14 and milling regions 13 are displayed where the board in later steps is dissected and where the then to be formed locking elements (already indicated in the board 10 in FIG. 7) will be formed. The locking elements depicted in FIG. 7 are for dimension-illustrating purposes only, since at this stage the laminated board is not yet sawed up and the locking elements are not milled yet either. It is unnecessary to form an impression over the sawing 14 and the profile milling regions 13, as these will be removed anyway. While it is possible to apply a pair of V-shaped impressions by the press plate, U-shaped impressions as shown in FIG. 7 are preferred. After the impressed region I, comprising the impressions 9 is made into the board 10 by the press plate 11, the laminate board 10 is sawed up into panels (not shown). For this purpose, saws with very high sawing speeds (in the range of several meters per second) are employed. Such high sawing speeds obviously enforce a trade-off with precision.

Figure 8:
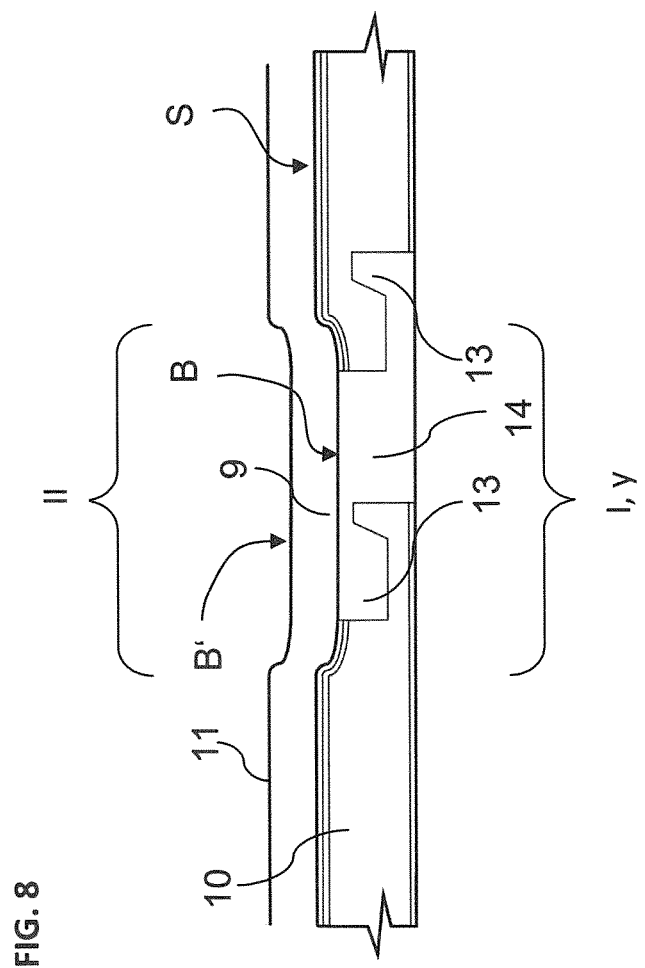
FIG. 8 shows a board before being sawed into panels and being milled, together with the surface of a press plate according to the invention

In analogy to FIG. 7, FIG. 8 shows a board 10 before being sawed into panels and being milled, together with the surface of a corresponding press plate 11 used for its production. In contrast to the embodiment shown in FIG. 7 the impressed region I has only one impression which extends over the complete width of the impressed region. At the same time the corresponding press plate 11 has a pressing region II which exhibits only one pressing means.

Figure 9:
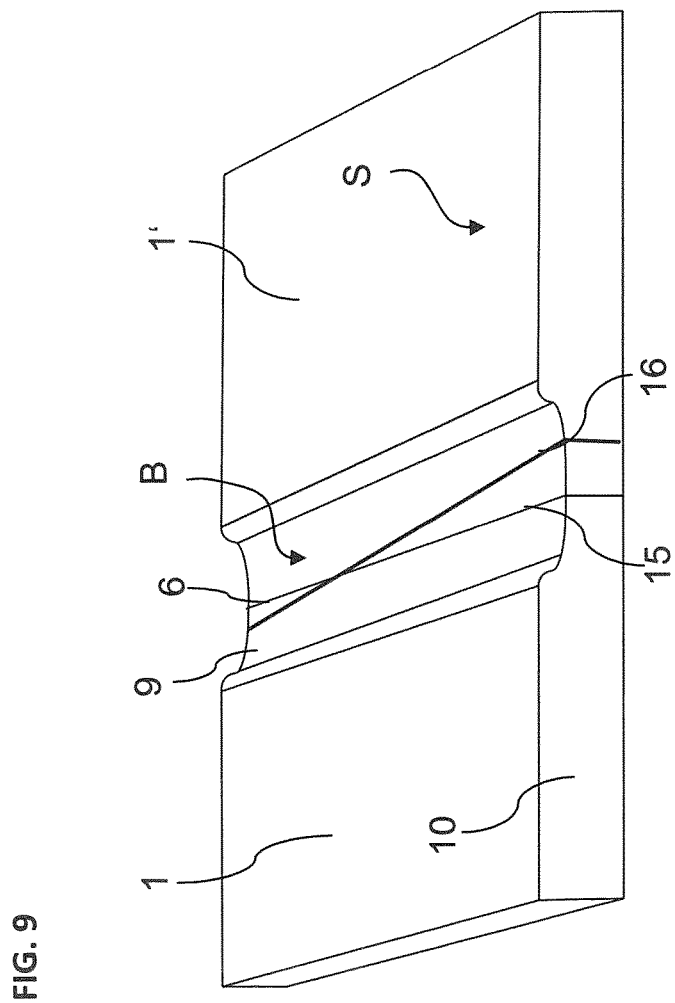
FIG. 9 shows a schematic side view of the abutment region of two panels produced according to the invention, together with an optimum- and a misaligned abutment line

FIG. 9 shows the board 10 of FIG. 8 after the pressing step in a perspective view. Shown is the dissecting step in which the board 10 is dissected with e.g. a buzz saw in two distinct raw panels 1 and 1'. Reference numeral 15 indicates a perfect dissection line. However, if any alignment errors either of the panel 10 or the dissection means, e.g. the buzz saw occur, a dissection e.g. along a mismatching dissection line 16 occurs. The errors can be of systematic origin (e.g. if the buzz saw is slightly mismatched) or of occasional nature (such as e.g. a onetime mismatch of the board 10 during dissection). This mismatching line 16 can e.g. run parallel to the ideal dissection line 15 (e.g. a parallel-shift) and/or slightly angled thereto (as is the case in FIG. 9). Due to the specific determination of the width of the pressing region in the pressing plate 11, or in the corresponding impressed region in the board, the present invention guarantees that the aforementioned errors occurring during the dissection step can be compensated. Since the U-shaped impression shown in FIGS. 8 and 9 has a substantial portion of a near horizontal surface, a slight misalignment of the dissection line does not result in any misalignment of the height of the abutment surface of the produced panels 1, 1'. The misalignment is far less detectable by the human eye and no liquid gathering crevasses are formed. Furthermore, portions of a liquid spill will remain on the substantially near horizontal surface portions of U-shaped bevels and can be cleaned away or evaporate by themselves, while far more liquid would arrive at the abutment surfaces of V-shaped grooves and could possibly cause more swelling there. Accordingly, also the resulting boards 1, 1' produced by dissection along a mismatched dissection line are shaped to perfectly fit each other so that less rejected boards are produced.

The decorative layer may also include special portions to decorate the bevel, for example a color contrasting to the panel surface may be used in the bevels. Typically this is a color which is darker than the panel surface decor.

Figure 10:
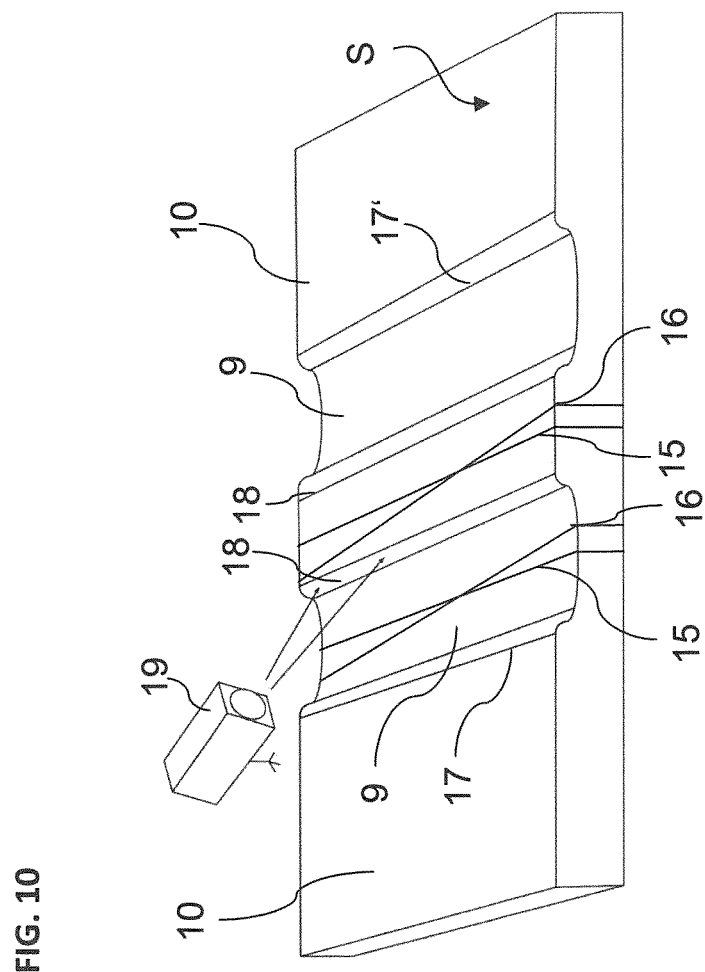
FIG. 10 shows schematically how the optimum abutment- and sawing line is detected by optical distance measuring means along an undecorated flank

FIG. 10 displays the dissection step with a board 10 according to FIG. 7 comprising an impressed region I with two impressions 9. Since the inner flanks 18 of each of the protrusion between the both impressions 9 is sawed and milled away at a later stage anyhow, it is possible to print a provisional marker onto at least one of these inner flanks 18 by e.g. means of a uniform color or a decorative layer. This marker can then be used together with optical distance sensors 19 to align the high-speed saws in real time, thus providing more accuracy to the sawing process. The marker can be of a special detectable color or can also consist in the simple absence of a décor portion. FIG. 10 schematically shows how the optimum abutment- and sawing line 15 is detected by optical distance measuring means 19 along an undecorated flank 18.

Figure 11:
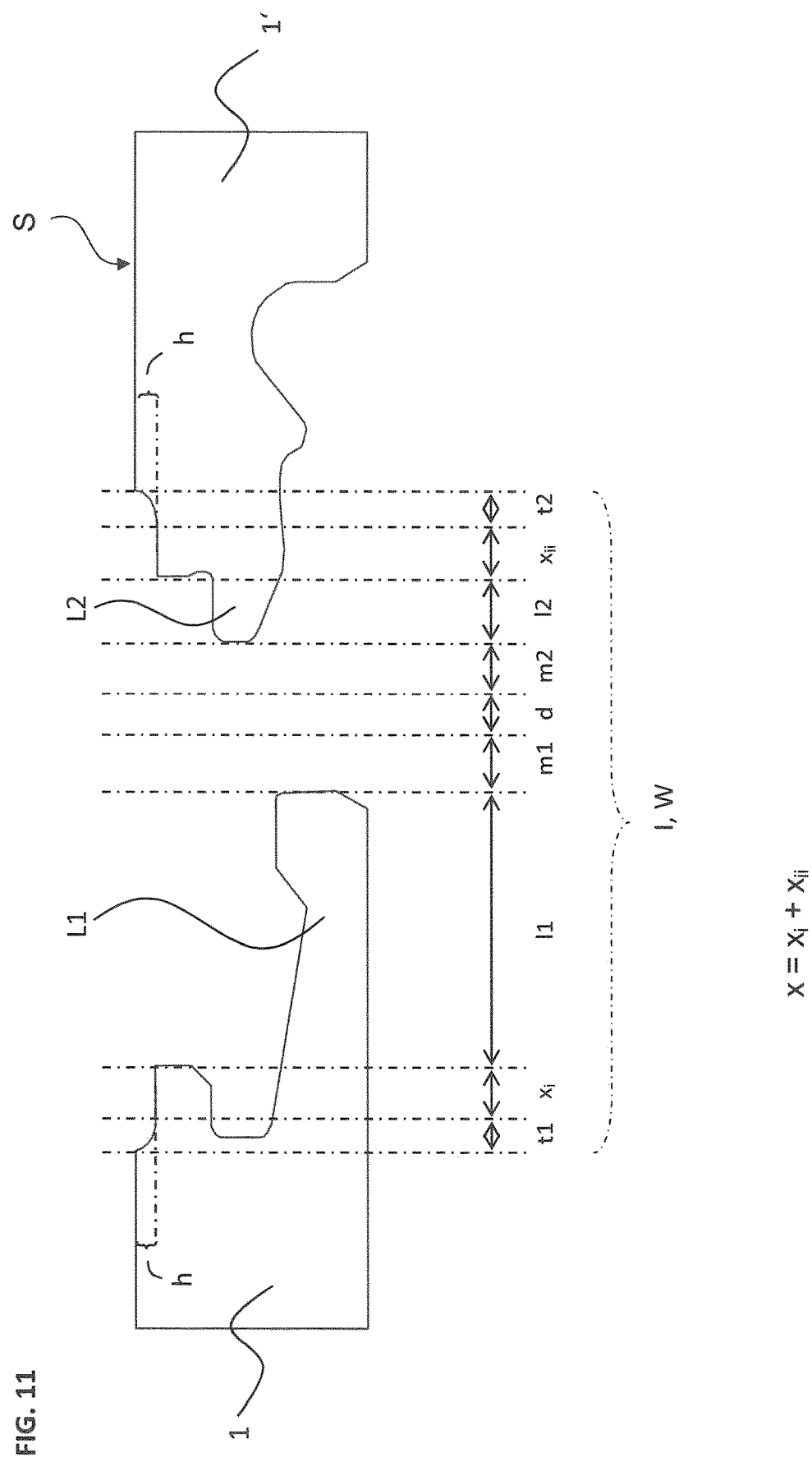
FIG. 11 shows two panels dissected from a board with specific measurements

FIG. 11 shows two panels 1, 1' after the raw panels cut from a board have been milled in order to obtain the locking means L1, L2. In FIG. 11 the boards 1, 1' artificially are aligned in a way they have been present in the (no longer existing) board 10 as shown in FIG. 7 or 8. FIG. 11 illustrates the selection of the width W of the impressed region I in the board 10, or the width W' of the pressing region II in the press plate 11, respectively.

The at least one impressed region I has an overall width W which is the sum of the dissection width d, the first width l1 of the first mechanical locking means L1 (measured from an abutment line of the upper edge of an according panel 1), the second width l2 of the second mechanical locking means L2 (measured from an abutment line of the upper edge of an according panel 1'), the width t1, t2 of the transitions T1, T2, an sacrificial machining width m1+m2, as well as a manufacturing tolerance x (being the sum of the displayed fractions $x_i$ and $x_{ii}$ of the manufacturing tolerance x) said manufacturing tolerance x being calculated as 0.10 to 3.0-fold of the dissection width (d).

The corresponding press plate accordingly has a pressing region II with an overall width W' which is the sum of the width t1, t2 of the transitions T1, T2 of the impressed region I of the board 10, a dissection width d when the board 10 is dissected with a dissection means having said dissection width d, a first width l1 and a second width l2 of pairing mechanical locking means L1, L2 to be milled out at opposite edges of the raw boards, an sacrificial machining width m1+m2, as well as a manufacturing tolerance x, said manufacturing tolerance x being calculated as 0.10 to 3.0-fold of the dissection width d.

The manufacturing tolerance x gives some degree of "play" so that when the board is not ideally cut nevertheless usable boards 1, 1' can be produced.

Figure 12A:
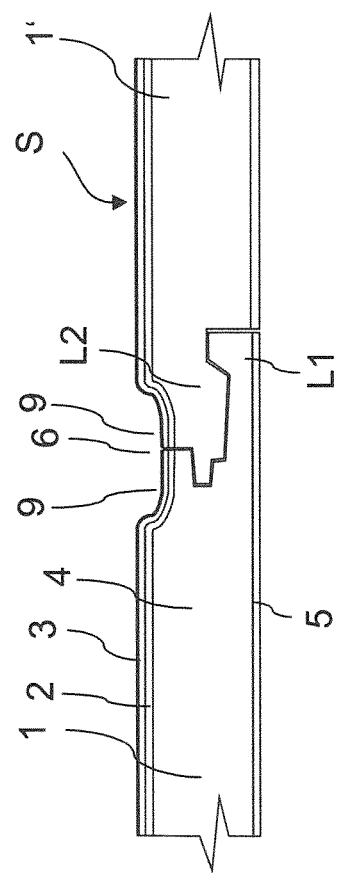
FIG. 12a shows a schematic side view of two connected panels with a symmetrical U-bevel
Figure 12B:
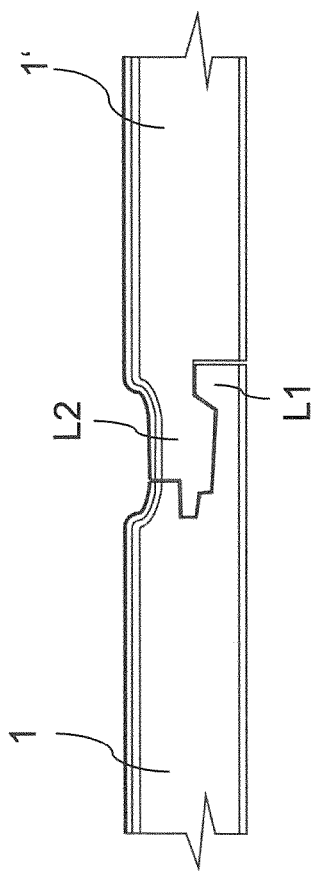
FIG. 12b shows a schematic side view of two connected panels with an asymmetrical U-bevel
Figure 12C:
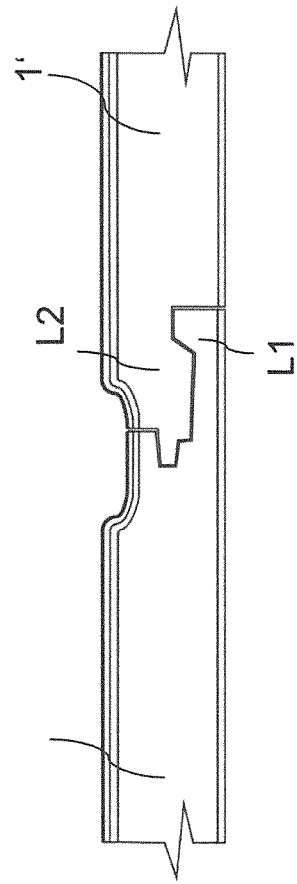
FIG. 12c shows another schematic side view of two connected panels with an asymmetrical U-bevel

FIGS. 12a-c show schematic side views of two connected panels 1, 1' produced according to the present invention. In order to obtain such finished panels from the raw panels sawed from the board 10, it is necessary to cut a large laminated board into panels and to mill locking elements L1, L2 (mostly in the form of locking profiles) onto the edges of the cut raw panels. Even if the former dissection line does not fully run through the ideal dissection line, the former described "play", i.e. the additional manufacturing tolerance x guarantees that the finished panels 1, 1' always abut at the same height. An example of two panels 1, 1' ideally cut and milled is shown in FIG. 12a. In FIGS. 12b and 12c (reference numerals not shown) cross-sections through non-ideal cut and milled panels 1, 1' in installed manner are shown. As becomes visible, even though the cutting—and accordingly the abutment line—is not in the very middle of the produced bevel (e.g. if a complete parallel shift of the abutment line has occured), a perfect alignment of the panels 1, 1' is possible, avoiding the errors of the prior art e.g. discussed in FIG. 4.

LIST OF REFERENCE SIGNS 1, 1' Panel
2 Decorative layer
3 Wear layer
4 Panel core
5 Backing layer 6 Optimal butt joint
6' Misaligned butt joint
L1, L2 Locking means or elements
l1 width of locking element L1
l2 width of locking element L2
I Impressed region
W overall width of impressed region
B Bottom of impressed region
9 Impressions
y Width of impressions
z Distance between impressions
h Depth of impressions
T1, T2 Transitions of impression s 9
t1, t2 width of transitions T1, T2
10 Board before being sawed and milled to panels
S Surface of board 10
11 Press plate
11' Main body of press plate
11" Pressing surface of press plate
II Pressing region
W' overall width of pressing region
B' Surface of pressing region
20, 21 Impression means
y' Width of impression means
z' Distance between impression means
h' Height of impression means
T1', T2' Transitions of impression means 20, 21
t1', t2' Width of transitions T1', T2'
13, 13' Profile milling region
14 Sawing region
d Sawing width
m1, m2 Sacrificial machining width
x Manufacturing tolerance
Optimal sawing line
16 Misaligned sawing line
17, 17': Decorated inner bevel flank
18 Inner flank of the impressions
19 Optical distance sensor

The invention claimed is:

1. A method for producing panels from a board, the method comprising:
providing a board comprising a core material board laminated with a laminate material layer onto a surface of the core material board forming a laminated surface of the board, said board having at least one impressed region, comprising at least one impression of the laminated surface, said at least one impression has a linear progression and extends completely over the laminated surface of the board, wherein in cross-section perpendicular to the extension direction of each of the at least one impression said impressed region having transitions at each outermost region of the impressed region where a transition of the surface to a bottom of the impressed region occurs, said transitions having a width and being adjoined by a part of the impressed region where the bottom of the impressed region is parallel to the surface of the board,
linearly dissecting the board along a dissection line running in each of the at least one impressed regions in one or more dissection steps to produce raw boards with a dissection means having a dissection width,
milling out pairing mechanical locking means at opposite edges of the raw boards, comprising a first mechanical locking means having a first width and a pairing second mechanical locking means having a second width,
wherein the at least one impressed region having an overall width, wherein the overall width is equal to a sum of the dissection width, the first width of the first mechanical locking means, the second width of the second mechanical locking means, the width of the transitions, a sacrificial machining width, and a manufacturing tolerance, said manufacturing tolerance being calculated as 0.10 to 3.0-fold of the dissection width.

2. The method according to claim 1, wherein the manufacturing tolerance is calculated as 0.25 to 2.5-fold of the dissection width.

3. The method according to claim 1, wherein the linear dissecting of the board is accomplished by sawing.

4. The method according to claim 1, wherein the at least one impressed region comprises two pairwise and parallel aligned impressions, said impressions having a linear progression and extending completely over the surface of the board.

5. The method according to claim 4, wherein
a) the impressions have a width y with a distance z between the two impressions fulfilling the following criteria: $0.5\ y \leq z \leq 10.0\ y$, or
b) the impressions have a width in between 1.0 and 20 mm, or
c) a distance between the two impressions forming each pair of impressions is between 1.5 and 50 mm, or
d) the impressions have a width y with a distance z between the two impressions fulfilling the following criteria: $0.5\ y \leq z \leq 10.0\ y$, and the impressions have a width in between 1.0 and 20 mm, or
e) the impressions have a width y with a distance z between the two impressions fulfilling the following criteria: $0.5\ y \leq z \leq 10.0\ y$, and a distance between the two impressions forming each pair of impressions is between 1.5 and 50 mm, or
f) the impressions have a width in between 1.0 and 20 mm, and a distance between the two impressions forming each pair of impressions is between 1.5 and 50 mm, or
g) the impressions have a width y with a distance z between the two impressions fulfilling the following criteria: $0.5\ y \leq z \leq 10.0\ y$, the impressions have a width in between 1.0 and 20 mm, and a distance between the two impressions forming each pair of impressions is between 1.5 and 50 mm.

6. The method according to claim 1, wherein the board has rectangular shape with at least one impressed region, or the board comprises at least two impressed regions and the at least two impressed regions are aligned parallel to each other and/or intersect at right angle.

7. The method according to claim 1, wherein the board has a rectangular shape with long sides and short sides, comprising at least one first impressed region parallel to the long sides and least one second impressed region parallel to the short sides, intersecting each other.

8. The method according to claim 7, wherein the board comprises:
2 to 15 impressed regions parallel to the long sides and/or
1 to 6 impressed regions parallel to the short sides.

9. The method according to claim 1, wherein a depth of the at least one impressed region is between 0.1 and 2.0 mm.

10. The method according to claim 1, wherein the transitions have a linear or curved progression.

11. The method according to claim 1, wherein the width of each of the transitions:
in relation to an overall width of the impressed region is between 0.1% to 20%, and/or
the width of each of the transitions is between 0.2 and 10.0 mm.

12. The method according to claim 1, wherein the first width of the first mechanical locking means is between 2.0 and 20 mm, and/or
the second width of the second mechanical locking means is between 0 and 10 mm.

13. The method according to claim 1, wherein the sacrificial machining width is between 0 and 10 mm.

14. The method according to claim 1, wherein:
the cross section of the at least one impressed region or of the impressions is U-shaped, semi-circular, trapezoidal, rectangular, trough-shaped, or a combination thereof, and/or
the surface of the board is smooth or comprises impressions, and/or
a surface of the transitions, the bottom is smooth, the laminate material layer in the region of the transitions, and/or the bottom (B) are/is unicolor.

15. The method according to claim 1, wherein the pairwise and parallel aligned impressions are separated by a protrusion where the impressions have inner flanks, wherein at least one of the inner flanks is monitored by a detection means, resulting in a monitoring signal which is utilized to control a position of the dissection means during dissecting.

16. The method according to claim 15, wherein the inner flanks are unicolor.

17. A press plate for producing boards utilized in producing panels, the main body comprising a pressing surface for pressing a board,
said main body comprising:
at least one pressing region, having at least one impression means, said at least one impression means projects beyond the pressing surface, said at least one impression means has linear progression and extends over the pressing surface completely,
wherein in a cross-section perpendicular to the extension direction of each of the at least one impression means said pressing region having transitions at each outermost region of the pressing region where a transition of the pressing surface to an upper surface of the pressing region occurs, said transitions having a width and being adjoined by a part of the pressing region where the upper surface of the pressing region is parallel to the pressing surface,
wherein
a) the at least one pressing region comprises two pairwise and parallel aligned impressions means, said impressions means have linear progression and extend over the complete pressing surface of the press plate, or
b) the press plate has a rectangular shape with long sides and short sides, comprising at least one first pressing region parallel to the long sides and at least one second pressing region parallel to the short sides, intersecting each other.

18. The press plate according to claim 17, wherein the at least one pressing region having an overall width, said overall width is the sum of the widths of the transitions, a dissection width of the board being dissected with a dissection means having said dissection width, a first width and a second width of pairing mechanical locking means to be milled out at opposite edges of the raw boards, a sacrificial machining width, and a manufacturing tolerance, said manufacturing tolerance being calculated as 0.10 to 3.0-fold of the dissection width.

19. The press plate according to claim 17, wherein the manufacturing tolerance is calculated as 0.25 to 2.5-fold of the dissection width.

20. The press plate according to claim 17, wherein the impression means have a width (y') with a distance (z') between the both impression means fulfilling the criteria: $0.5\ y' \leq z' \leq 10.0\ y'$, and/or
the impression means have a width (y') between 1.0 and 20 mm, and/or
a distance (z) between the both impression means forming each pair of impressions is between 1.5 and 50 mm.

21. The press plate according to claim 17, which press plate has rectangular shape with the at least one pressing region extending parallel to the edges of the press plate, or
comprises at least two pressing regions, said at least two pressing regions are aligned parallel to each other or intersect at a right angle.

22. The press plate according to claim 21, wherein the number of pressing regions parallel to the long sides is larger than the number of pressing regions parallel to the short sides.

23. The press plate according to claim 17, wherein a height of the at least one pressing regions is between 0.1 and 2.0 mm, and/or
the transitions have linear or curved progression, and/or
the width of each of the transitions in relation to an overall width of the pressing region is between 0.1% to 20%, and/or
the width of each of the transitions is between 0.2 and 10.0 mm.

24. The press plate according to claim 17, wherein the cross section of the at least one pressing regions is U-shaped, semi-circular, trapezoidal, rectangular, trough-shaped, and/or a combination thereof, and/or
the pressing surface is smooth or comprises impressions and/or a surface of the press plate in the region of the transitions and/or an upper surface is smooth.

25. A method for the production of a board for producing panels, the method comprising:
providing a core material board,
providing a laminate material layer onto a surface of the core material board,
joining the laminate material layer and the core material board by pressing with a press plate, wherein the pressing surface of the press plate is pressed onto the laminate material layer,
or pressing a core material board laminated with a laminate material layer with a press plate, wherein the pressing surface of the press plate is pressed onto the laminate material layer,
wherein the at least one pressing region of the press plate compacts the laminate material layer and/or the core material board, to form at least one impressed region in the laminate material layer and/or the core material board;
wherein said press plate is the press plate of claim 17.

26. The method according to claim 25, wherein the at least one impressed region has an overall width which overall width is the sum of the dissection width, the width of the first profile, the width of the second profile, the width of the transitions, a sacrificial machining width (m1+m2), and a manufacturing tolerance (x), said manufacturing tolerance (x) being calculated as 0.10 to 3.0-fold of the dissection width.

27. The method according to claim 25, wherein the surface of the core material board onto which the laminate material layer is provided is smooth or has impressions which impressions correspond to the impression means of the press plate.

28. A board for the production of panels, comprising a core material board laminated with a laminate material layer onto a surface of the core material board forming a laminated surface of the board, said board having at least one impressed region, comprising at least one impression of the laminated surface, said at least one impression has a linear progression and extends over the complete surface of the board, wherein in cross-section perpendicular to the extension direction of each of the at least one impression said impressed region having transitions at each outermost region of the impressed region where a transition of the surface to a bottom of the impressed region occurs, said transitions having a width and being adjoined by a part of the impressed region where the bottom of the impressed region is parallel to the surface of the board, wherein the board has a rectangular shape with long sides and short sides, comprising at least one first impressed region parallel to the long sides and at least one second impressed region parallel to the short sides, intersecting each other.

29. The board according to claim 28, wherein the at least one impressed region having an overall width which overall width is a sum of the dissection width when the board is dissected with a dissection means having said dissection width (d), a first width and a second width of pairing mechanical locking means to be milled out at opposite edges of the raw boards, a sacrificial machining width (m1+m2), as well as a manufacturing tolerance (x) said manufacturing tolerance (x) being calculated as 0.10 to 3.0-fold of the dissection width (d).

30. A panel comprising
a core material board laminated with a laminate material layer onto a surface of the core material board forming a laminated surface of the panel,
pairing mechanical locking means at opposite edges of the panels, comprising a first mechanical locking means having a first width at a first edge and a pairing second mechanical locking means having a second width at an opposite edge, wherein
the panel comprises impressions of the laminated surface, wherein along each of the opposite edges one of the impressions of the laminated surface is present, each of the impressions of the laminated surface is part of the respective edge, has linear progression and extends over the complete surface of the board, wherein in cross-section perpendicular to the extension direction each of the impressions of the laminated surface has a transition at the region farthest from the respective edge where the respective one of the impressions of the laminated surface is present where a transition of the surface to a bottom of the one of the impressions of the laminated surface occurs, said transitions having a width and being adjoined by a part of the impressed region where the bottom of the impressed region is parallel to the surface of the board,
wherein the panel is produced according to the method of claim 1, wherein the board provided in said method has a rectangular shape with long sides and short sides, comprising at least one first impressed region parallel to the long sides and at least one second impressed region parallel to the short sides, intersecting each other.

* * * * *